US012263955B2

United States Patent
Pettey et al.

(10) Patent No.: US 12,263,955 B2
(45) Date of Patent: Apr. 1, 2025

(54) AIRCRAFT FUEL TANKS INCLUDING SELF-SEALING FABRIC

(71) Applicant: Response Technologies, LLC, Coventry, RI (US)

(72) Inventors: David Allen Pettey, Portsmouth, RI (US); Richard Fox, Smithfield, RI (US)

(73) Assignee: RESPONSE TECHNOLOGIES, LLC, Coventry, RI (US)

( * ) Notice: Subject to any disclaimer, the term of this patent is extended or adjusted under 35 U.S.C. 154(b) by 502 days.

(21) Appl. No.: 17/578,081

(22) Filed: Jan. 18, 2022

(65) Prior Publication Data

US 2023/0227168 A1 Jul. 20, 2023

(51) Int. Cl.
| | |
|---|---|
| *B64D 37/06* | (2006.01) |
| *B32B 1/00* | (2024.01) |
| *B32B 5/02* | (2006.01) |
| *B32B 5/26* | (2006.01) |
| *B60L 50/72* | (2019.01) |
| *B64C 3/34* | (2006.01) |
| *B64C 27/12* | (2006.01) |
| *B65D 25/14* | (2006.01) |

(52) U.S. Cl.
CPC ............... *B64D 37/06* (2013.01); *B32B 1/00* (2013.01); *B32B 5/02* (2013.01); *B32B 5/26* (2013.01); *B60L 50/72* (2019.02); *B64C 3/34* (2013.01); *B65D 25/14* (2013.01); *B32B 2262/0253* (2013.01); *B32B 2307/54* (2013.01); *B32B 2307/72* (2013.01); *B32B 2307/762* (2013.01); *B32B 2605/18* (2013.01); *B60L 2200/10* (2013.01); *B64C 27/12* (2013.01); *B65D 2590/245* (2013.01)

(58) Field of Classification Search
None
See application file for complete search history.

(56) References Cited

U.S. PATENT DOCUMENTS

| | | | |
|---|---|---|---|
| 2,401,627 A | 6/1946 | Eger | |
| 2,504,421 A * | 4/1950 | Hawkins, Jr. | .......... B64D 27/20 220/900 |
| 3,698,587 A | 10/1972 | Baker et al. | |
| 3,949,894 A | 4/1976 | Underwood | |
| 3,980,106 A | 9/1976 | Wiggins | |
| 4,088,240 A | 5/1978 | San Miguel | |
| 4,216,803 A | 8/1980 | Hall | |
| 4,368,086 A | 1/1983 | Villemain | |

(Continued)

OTHER PUBLICATIONS

"Advances in Self-Sealing Fuel Tank Technology," Defense Systems Information Analysis Center, vol. 3, No. 3, Summer 2016, 8 pages.

*Primary Examiner* — Michael C Romanowski
*Assistant Examiner* — Thomas J Kessler
(74) *Attorney, Agent, or Firm* — SLATER MATSIL, LLP

(57) ABSTRACT

In an embodiment, an aircraft includes a fuselage; a propulsion system powered by a fuel; and a fuel cell configured to store the fuel, the fuel cell including an inner layer configured to contact the fuel; an outer layer; and a self-sealing fabric structure formed from ultra-high molecular weight polyethylene (UHMWPE), the self-sealing fabric structure being between the inner layer and the outer layer, the self-sealing fabric structure being configured to self-seal a hole formed in the inner layer and the outer layer by a projectile.

20 Claims, 12 Drawing Sheets

(56) References Cited

U.S. PATENT DOCUMENTS

| | | | |
|---|---|---|---|
| 7,169,452 B1 | 1/2007 | Monk et al. | |
| 7,794,808 B2 | 9/2010 | Dudt et al. | |
| 9,694,629 B1 * | 7/2017 | Dry | B32B 33/00 |
| 9,770,883 B1 * | 9/2017 | Luzetsky | B60K 15/00 |
| 10,082,372 B1 * | 9/2018 | Iliev | F41J 13/00 |
| 10,471,676 B1 * | 11/2019 | Whipple | B32B 25/12 |
| 10,513,173 B1 | 12/2019 | Misciagna | |
| 2012/0298660 A1 * | 11/2012 | Bongiovanni | F41H 5/0478 |
| | | | 220/200 |
| 2015/0056391 A1 * | 2/2015 | Dry | B29C 73/163 |
| | | | 428/35.9 |
| 2015/0151630 A1 * | 6/2015 | Bethea | C23C 28/042 |
| | | | 220/562 |
| 2016/0303799 A1 | 10/2016 | Pettey et al. | |
| 2016/0347038 A1 * | 12/2016 | Childress | B64D 37/32 |
| 2017/0057341 A1 * | 3/2017 | Wilenski | B60K 15/03177 |
| 2021/0291486 A1 * | 9/2021 | Wagner | B32B 27/08 |

* cited by examiner

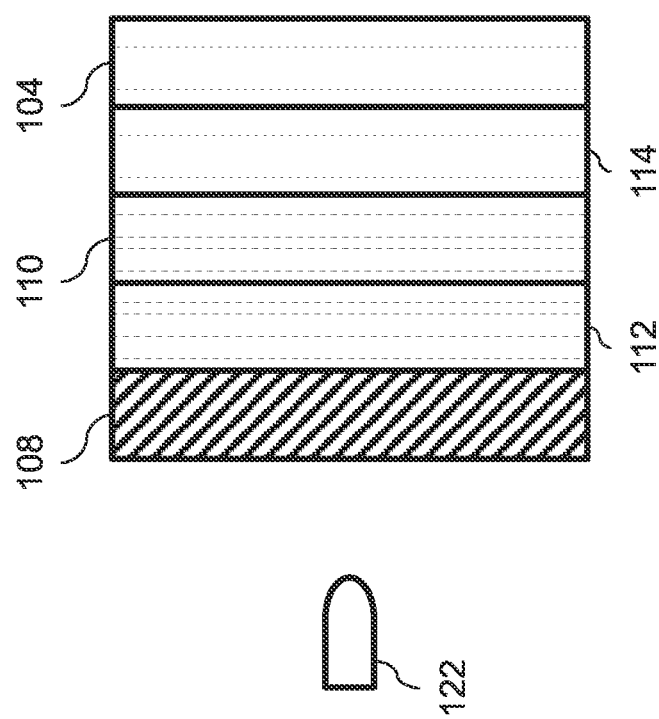

AIRCRAFT FUEL TANKS INCLUDING SELF-SEALING FABRIC

TECHNICAL FIELD

The present disclosure relates generally to the containment of liquids, such as fuel, within an enclosure and, in particular, to self-sealing fuel tanks which include fabrics on or within one or more walls of an enclosure, such as a fuel tank, the fabrics being selected to self-seal in response to the enclosure being punctured by an object, such as a projectile, thereby reducing leakage of a liquid from the enclosure.

BACKGROUND

In military and civilian applications, the leakage of liquid from a container after the container has been punctured can lead to financial loss, inconvenience, or even loss of life. While the reach of this problem touches many fields of application, one area in which leak prevention is particularly critical is the storage of fuel in fuel tanks. The fuel tanks may include flexible fuel bladders, rigid fuel tanks, and the like. In military applications for both ground and airborne vehicles, fuel tanks are at risk of being pierced by projectiles and the like (e.g., incoming fire, such as bullet rounds and shrapnel). When such a puncture occurs, fuel may leak from the fuel tank, reducing the effective range of the vehicle and posing a fire hazard, among other detrimental effects.

Fuel tanks that are tolerant to penetration by projectile have been in use since the World War II era. Previous fuel tanks have incorporated various formulations of rubber to counteract the impact of a projectile against the fuel tank. When a projectile pierces the fuel tank wall, fuel escapes from the resulting hole in the fuel tank wall. The rubber swells when exposed to the fuel, thereby closing and sealing the hole in the fuel tank wall. The use of rubber as a protective layer against leakage has several drawbacks. For example, rubber-based sealing liners have a slow response time, which becomes progressively worse over time as the fuel tank ages. Another drawback is that if fuel leaks from an inside liner of the tank, which may occur in the case of a compromised liner, the rubber in the rubber sealing liner becomes prematurely activated. Once activated, the fuel tank is decommissioned. Another drawback of rubber sealing liners is that the rubber requires exposure to fuel or other aromatic substances in order to be activated and to swell. Thus, rubber sealing liners cannot be used in non-fuel applications, such as water tanks or water hoses. In addition, rubber is a relatively heavy product and adds an undesirable weight penalty in weight-sensitive applications, such as aerospace applications. Accordingly, a need has arisen for liquid leakage barriers that have a reduced weight penalty and an enhanced operating lifespan, while avoiding other drawbacks of existing self-sealing liquid barriers, including rubber-based sealing liners.

SUMMARY

In accordance with an embodiment, an aircraft fuel cell includes an inner layer configured to contact a fuel; an outer layer; and a self-sealing fabric structure between the inner layer and the outer layer, the self-sealing fabric structure being configured to capture a projectile and self-seal a hole formed in the inner layer and the outer layer by the projectile. In an embodiment, the self-sealing fabric structure includes an ultra-high molecular weight polyethylene (UHMWPE) fabric. In an embodiment, the self-sealing fabric structure has a thickness of less than 0.400 inches. In an embodiment, the self-sealing fabric structure has a density ranging from 0.2 g/cm$^3$ to 0.97 g/cm$^3$. In an embodiment, the self-sealing fabric structure includes from 10 to 45 layers of self-sealing fabric. In an embodiment, the self-sealing fabric structure includes a fuel-tight material. In an embodiment, the self-sealing fabric structure includes a material having a yield strength ranging from 0.15 GPa to 0.90 GPa. In an embodiment, the self-sealing fabric structure is separated from at least one of the inner layer or the outer layer by a gap. In an embodiment, the self-sealing fabric structure includes excess material configured to be pulled into the hole by the projectile and self-seal the hole. In an embodiment, the self-sealing fabric structure includes a material that is unreactive to the fuel.

In accordance with another embodiment, a method for sealing a liquid storage container includes providing a liquid storage container, the liquid storage container including a self-sealing fabric structure on an inner layer; and in response to a hole being formed in the inner layer of the liquid storage container by a projectile, sealing the hole by catching the projectile in the self-sealing fabric structure, the self-sealing fabric structure being pulled into the liquid storage container by the projectile, and a material of the self-sealing fabric structure sealing the hole. In an embodiment, the method further includes repairing the liquid storage container by replacing a portion of the self-sealing fabric structure. In an embodiment, a material of the self-sealing fabric structure is un-reactive to a liquid stored in the liquid storage container. In an embodiment, the self-sealing fabric structure catches the projectile without the projectile penetrating through the self-sealing fabric structure.

In accordance with yet another embodiment, an aircraft includes a fuselage; a propulsion system powered by a fuel; and a fuel cell configured to store the fuel, the fuel cell including an inner layer configured to contact the fuel; an outer layer; and a self-sealing fabric structure formed from ultra-high molecular weight polyethylene (UHMWPE), the self-sealing fabric structure being interposed between the inner layer and the outer layer, the self-sealing fabric structure being configured to self-seal a hole formed in the inner layer and the outer layer by a projectile. In an embodiment, the self-sealing fabric structure includes excess material configured to be pulled into the hole by the projectile, the excess material being configured to self-seal the hole. In an embodiment, the self-sealing fabric structure is separated from the inner layer or the outer layer by a gap. In an embodiment, the self-sealing fabric structure includes from 10 to 45 layers of UHMWPE fabric. In an embodiment, the inner layer and the outer layer of the fuel cell include flexible layers such that the fuel cell is a flexible fuel bag. In an embodiment, the self-sealing fabric structure is non-reactive with the fuel.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A and 3B illustrate a portion of a wall of a fuel cell before and after the wall is struck by a projectile, in accordance with some embodiments;

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including by mere contact or by moving and/or non-moving mechanical connections.

Figure 1:
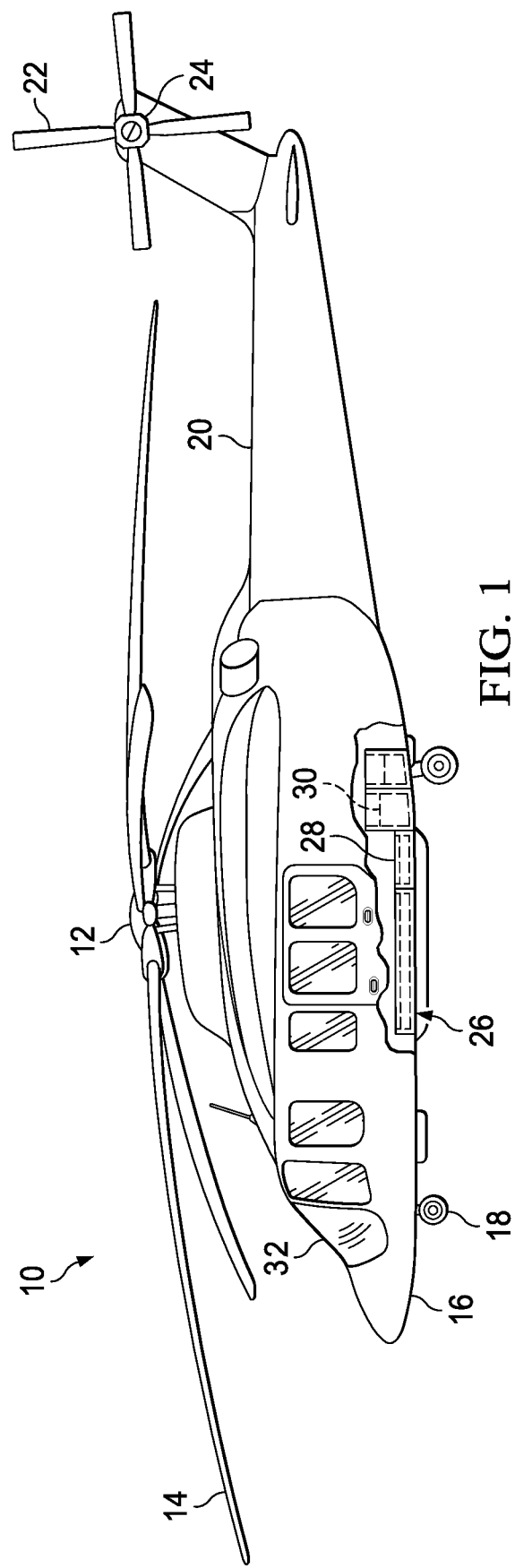
FIG. 1 illustrates a rotorcraft utilizing a self-sealing fabric structure, in accordance with some embodiments.

FIG. 1 illustrates a rotorcraft 10, in accordance with some embodiments. The rotorcraft 10 includes a main rotor system 12, which includes a plurality of main rotor blades 14. The pitch of each of the main rotor blades 14 may be controlled by a swashplate in order to selectively control the attitude, altitude, and movement of the rotorcraft 10. The swashplate may be used to collectively and/or cyclically change the pitch of the main rotor blades 14. The rotorcraft 10 also includes an anti-torque system, which may include a tail rotor 24, a no-tail-rotor (NOTAR), or a dual main rotor system. In the embodiment illustrated in FIG. 1, the rotorcraft 10 includes the tail rotor 24. The pitch of each tail rotor blade 22 in the tail rotor 24 may be collectively changed in order to vary thrust of the anti-torque system, providing directional control of the rotorcraft 10. The pitch of the tail rotor blades 22 is changed by one or more tail rotor actuators. In some embodiments, a fly-by-wire (FBW) system sends electrical signals to the tail rotor actuators or main rotor actuators to control the flight of the rotorcraft 10.

Power is supplied to the main rotor system 12 and the anti-torque system by engines. There may be one or more engines, which may be controlled according to signals from the FBW system. The output of the engines is provided to a driveshaft, which is mechanically and operatively coupled to the main rotor system 12 and the anti-torque system through a main rotor transmission and a tail rotor transmission, respectively.

The rotorcraft 10 further includes a fuselage 16 and tail section 20. The tail section 20 may include other flight control devices such as horizontal or vertical stabilizers, rudder, elevators, or other control or stabilizing surfaces that are used to control or stabilize flight of the rotorcraft 10. A landing gear system 18 provides ground support for the rotorcraft 10, and may be included in the fuselage 16 and/or the tail section 20. The fuselage 16 includes a cockpit 32, which includes displays, controls, and instruments. It should be appreciated that even though rotorcraft 10 is depicted as having certain illustrated features, the rotorcraft 10 may include a variety of implementation-specific configurations. For instance, in some embodiments, the cockpit 32 is configured to accommodate a pilot and/or a co-pilot, as illustrated. In some embodiments, the rotorcraft 10 may be operated remotely. In embodiments in which the rotorcraft 10 may be operated remotely, the cockpit 32 may be configured as a fully functioning cockpit to accommodate a pilot and/or a co-pilot to provide for greater flexibility of use, or may be configured with a cockpit having limited functionality. For example, the cockpit 32 may include accommodations for only one person who would function as the pilot or co-pilot with a remote operator functioning as a remote pilot, a remote co-pilot, or a back-up pilot. In some embodiments, the rotorcraft 10 may be configured as an unmanned vehicle, in which case the cockpit 32 may be eliminated entirely in order to save space and cost.

The rotorcraft 10 includes a fuel system 26, including a fuel tank 28 located in a lower portion of the fuselage 16. The fuel tank 28 is coupled to the fuselage 16 and may be fully or partially integrated with the fuselage 16. The fuel tank 28 may be independent from, but secured to the fuselage 16. In some embodiments, the fuel tank 28 may be located elsewhere in the rotorcraft 10. The fuel tank 28 includes one or more fuel cells 30, such as flexible fuel bags or rigid fuel cells, each of which contains fuel. The fuel cells 30 may be interconnected by hoses. The fuel contained in the fuel cells 30 is used as an energy source to power the various systems of the rotorcraft 10, such as main rotor system 12 and the tail rotor 24. The various components of the fuel system 26 are at risk of being pierced by projectiles and the like. For example, in military applications, the fuel system 26 is susceptible to being punctured by incoming enemy fire, such as bullet rounds and shrapnel. When components of the fuel system 26 are punctured, fuel may leak from the fuel system 26, which may reduce the effective range of the rotorcraft 10 and pose a fire or explosion hazard, among other detrimental effects.

Previous fuel cells have incorporated various formulations of rubber to counteract the impact of projectiles against the fuel cell. When a projectile pierces the fuel cell wall, fuel escapes from the resulting hole in the fuel cell wall. The rubber swells when exposed to the fuel, thereby closing and sealing the hole in the fuel cell wall. However, the use of rubber as a protective layer against leakage has several drawbacks. For example, rubber-based sealing liners have a slow response time, which becomes progressively worse as the fuel cell ages. Fuel may leak from an inside liner of the fuel cell, causing the rubber in the rubber-based sealing liners to be prematurely activated. Once the rubber-based sealing liners are activated, the fuel cell is decommissioned. Rubber-based sealing liners may have reduced effectiveness in low-temperature conditions. Further, the rubber-based sealing liners require exposure to fuel or other aromatic substances in order to be activated and to swell. Thus, the rubber-based sealing liners cannot be used in non-fuel applications, such as water tanks or water hoses. In addition, rubber is a relatively heavy product and adds an undesirable weight penalty when used on aircraft.

To address these and other drawbacks of rubber-based sealing liners, the disclosed embodiments include a self-sealing fabric structure that is attached on or within one or more walls of a liquid enclosure. The self-sealing fabric structure self-seals holes formed in the enclosure, such as by projectiles, thereby reducing leakage of the liquid from the enclosure. In the disclosed embodiments, the self-sealing fabric structure may be positioned on or within one or more walls of the fuel cells 30, fuel hoses interconnecting the fuel cells 30, and any other desired components of the fuel system 26. When a wall of a component of the fuel system 26 that includes the self-sealing fabric structure is pierced by a projectile or other object, a hole is formed in the wall. The projectile is caught by the self-sealing fabric structure. As the projectile passes through inner layers of the wall and extends the hole, the projectile pulls the self-sealing fabric structure through the hole, and the self-sealing fabric structure seals the hole. The self-sealing fabric structure may include a high strength material, such as ultra-high molecular weight polyethylene (UHMWPE), poly(p-phenylene-2, 6-benzobisoxazole) (PBO), poly(azanediyl-1,4-phenyleneazanediylterephthaloyl) (poly-aramid), combinations thereof, or the like, and may be wrapped loosely around an inner layer of the component wall. This allows the self-sealing fabric structure to catch the projectile and move with the projectile into the hole, pulling excess material of the self-sealing fabric structure into the hole and plugging the hole.

Unlike rubber-based sealing liners, the self-sealing fabric structure of the disclosed embodiments does not require contact with fuel or other aromatics to be triggered or activated, leading to several benefits. For example, the self-sealing fabric structure may be used across a wider range of liquid containers. The self-sealing fabric structure may be used to protect against the leakage of any non-solid substance, including any gas or liquid. For example, the self-sealing fabric structure may be used in the walls of a water tank to prevent the leakage of water therefrom. The self-sealing fabric structure is not prone to premature activation, which may occur in rubber-based sealing liners when fuel leaks through the innermost layer of the walls of components of the fuel system 26. The physical mechanism by which the self-sealing fabric structure seals holes is not impacted by temperature, and the self-sealing fabric structure can be used in low-temperature conditions. The self-sealing fabric structure is also effective at lower weights than previous rubber counterparts, allowing the self-sealing fabric structure to be used in weight-sensitive applications, such as aerospace applications. The self-sealing fabric structure is compatible with additively manufactured liquid enclosures and tanks, such as additively manufactured fuel tanks. Compared to rubber-based sealing liners, the self-sealing fabric structure has performance characteristics that do not degrade over the useful life of the enclosures, cells, bladders, containers, or tanks in which they are used.

It should be appreciated that the rotorcraft 10 is merely illustrative of a variety of aircraft that can implement the embodiments disclosed herein. The self-sealing fabric structures of the disclosed embodiments may be implemented on any aircraft. Other aircraft to which the self-sealing fabric structures may be applied include hybrid aircraft, tiltwing aircraft, tiltrotor aircraft, quad tiltrotor aircraft, unmanned aircraft, gyrocopters, propeller-driven airplanes, compound helicopters, jets, drones, and the like. Those skilled in the art will recognize that the self-sealing fabric structures of the disclosed embodiments can be integrated into a variety of aircraft configurations. It should be appreciated that even though aircraft are well-suited to implement the embodiments of the present disclosure, non-aircraft vehicles, including ground vehicles as well as devices such as water tanks, standalone fuel tanks, water hoses and non-enclosure panels, can also incorporate the disclosed self-sealing fabric structures.

Figure 2A:
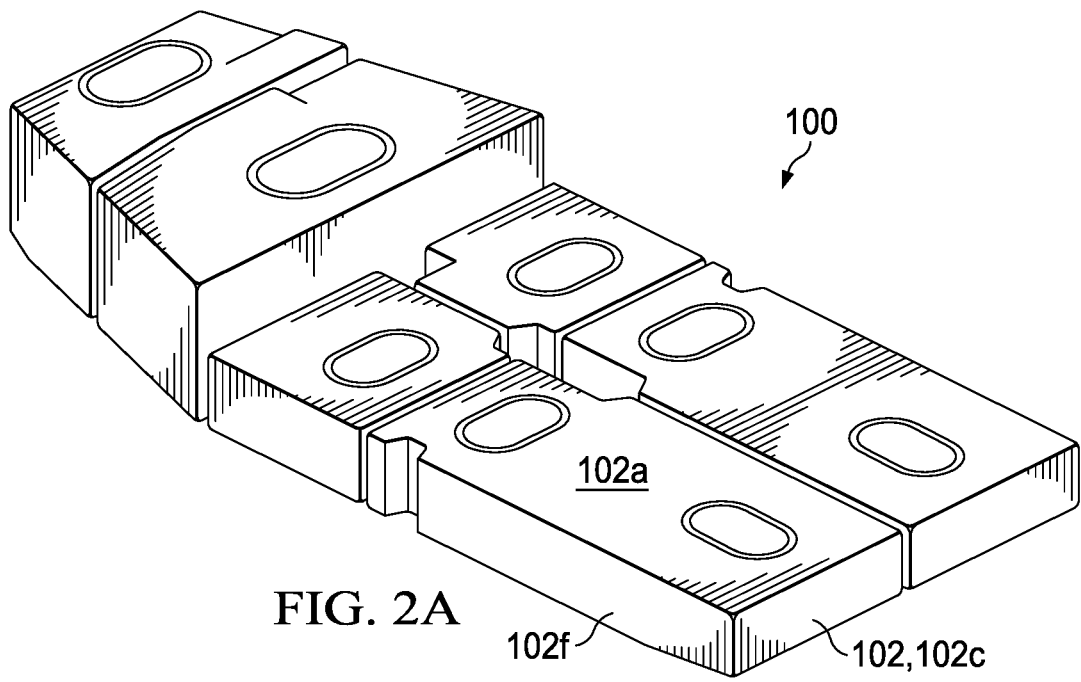
FIGS. 2A through 2C illustrate fuel cells including a self-sealing fabric structure, in accordance with some embodiments.
Figure 2B:
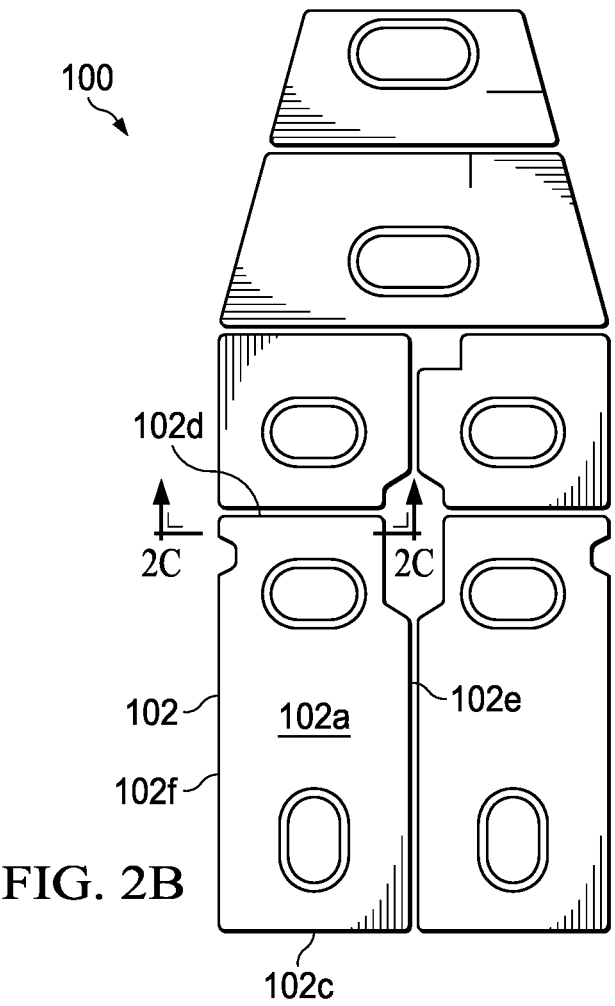
Figure 2C:
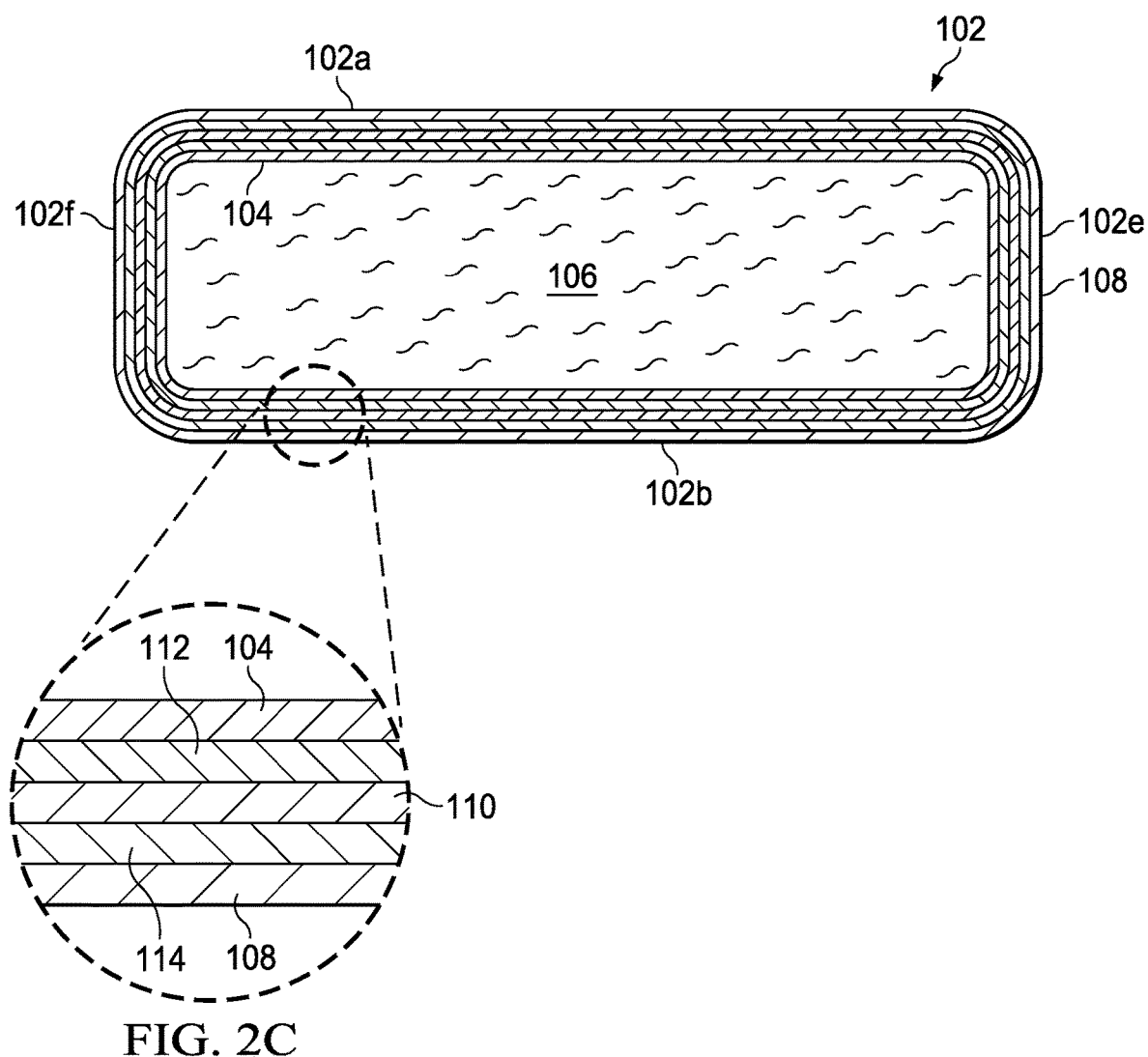

FIGS. 2A through 2C illustrate a fuel tank 100 and components thereof for a rotorcraft, such as the rotorcraft 10 illustrated in FIG. 1. The fuel tank 100 may include various fuel cells 102, which are fluidly coupled to one another and allow for the transfer of fuel or gas there between. FIG. 2C illustrates a cross-sectional view of one of the fuel cells 102. The fuel cell 102 illustrated in FIG. 2C is substantially similar to other fuel cells 102 of the fuel tank 100. Therefore, for sake of efficiency, certain features will be disclosed only with regard to the fuel cell 102 illustrated in FIG. 2C.

As illustrated in FIGS. 2A through 2C, the fuel cells 102 are formed from a plurality of walls including a top wall 102a, a bottom wall 102b, a forward wall 102c, an aft wall 102d, a port wall 102e and a starboard wall 102f. Each of the fuel cells 102 may include any number of curved or straight walls, each facing any desired direction. In FIG. 2C, the fuel cell 102 includes an inner layer 104. The inner layer 104 may be in contact with fuel or another liquid contained in the fuel cell 102. The inner layer 104 defines an internal fluid reservoir, which contains a fuel 106. As such, the inner layer 104 may be formed of a fuel-resistant or fuel-tolerant material. The inner layer 104 may be formed from various materials that are suitable for containing fuel 106. In some embodiments, the inner layer 104 may be formed from one or more materials that are resistant to being pierced. For example, the inner layer 104 may be made from metallic or metallic alloy materials that are resistant to impact from projectiles, such as military projectiles. The inner layer 104 may be made from composites, carbon-based materials, polymeric materials, or the like. In some embodiments, the inner layer 104 may be formed of polyvinylidene fluoride (PVDF), nylon, urethane, combinations or multiple layers thereof, or the like.

The fuel cell 102 includes an outer layer 108 that defines an outer surface of the fuel cell 102. In some embodiments, the outer layer 108 may be a moderate fuel barrier, and may prevent fuel from outside the fuel cell 102 from penetrating the walls of the fuel cell 102. The outer layer 108 may be made from various materials that are suitable for forming an outer surface of the fuel cell 102. In some embodiments, the outer layer 108 may be formed from one or more materials that are resistant to being pierced. For example, the outer layer 108 may be formed from metallic or metallic alloy materials that are resistant to impact from projectiles, such as military projectiles. The outer layer 108 may be made from composites, carbon-based materials, polymeric materials, or the like. Other suitable materials for both the inner layer 104 and the outer layer 108 may also be employed. In some embodiments, the inner layer 104 and the outer layer 108, as well as other layers of the fuel cell 102 may be flexible layers. As such, the fuel cell 102 may be a flexible fuel bag or bladder. In some embodiments, the inner layer 104 and the outer layer 108 may be rigid layers, such as metallic layers, such that fuel cell 102 forms a rigid fuel tank.

The fuel cell 102 includes a self-sealing fabric structure 110 interposed between the inner layer 104 and the outer layer 108. An inner intermediate layer 112 is interposed between the inner layer 104 and the self-sealing fabric structure 110 and an outer intermediate layer 114 is interposed between the outer layer 108 and the self-sealing fabric structure 110. Either or both of the inner intermediate layer 112 and the outer intermediate layer 114 may include one or more textile or fabric layers, which may be used to provide strength and/or structure for the fuel cell 102. Either or both of the inner intermediate layer 112 and the outer intermediate layer 114 may additionally or alternatively include other substances or layers, such as PVDF, PVDF having carbon black fibers for electrostatic protection, an elastomer (such as a polyurea elastomer, e.g., a LINE-X material, a DRAGONSHIELD-HT material, or the like), an adhesive, a tie-coat, a sealant (such as rubber for ballistic protection), combinations or multiple layers thereof, or any other suitable materials. In some embodiments, the inner intermediate layer 112 and/or the outer intermediate layer 114 may include nylon, such as HT-nylon. The inner intermediate layer 112 and the outer intermediate layer 114 may be optional and may be omitted in some embodiments. In embodiments in which the inner intermediate layer 112 and the outer intermediate layer 114 are omitted, the self-sealing fabric structure 110 may substantially fill the volume defined between the inner layer 104 and the outer layer 108.

In the embodiment of FIGS. 2A through 2C, the self-sealing fabric structure 110 is interposed between the inner layer 104 and the outer layer 108 on all of the walls 102a-102f of the fuel cell 102. However, the self-sealing fabric structure 110 may be included in less than all of the walls 102a-102f of the fuel cell 102. For example, in some embodiments, the self-sealing fabric structure 110 may only be included on the bottom wall 102b of the fuel cell 102; on the bottom wall 102b and partially up the forward wall 102c, the aft wall 102d, the port wall 102e, and the starboard wall 102f of the fuel cell 102; on any individual ones of the top wall 102a, the bottom wall 102b, the forward wall 102c, the aft wall 102d, the port wall 102e, and the starboard wall 102f; or the like. The self-sealing fabric structure 110 may be included in the walls 102a-102f of the fuel cell 102 based on where the fuel cell 102 is located on the rotorcraft 10 and where the fuel cell 102 is most likely to be struck by projectiles and the like.

The material of the self-sealing fabric structure 110 may be selected from various fabrics having high strength-to-weight ratios. In some embodiments, the self-sealing fabric structure 110 may be formed of an ultra-high molecular weight polyetheyle (UHMWPE) fabric (e.g., Spectra fabrics, Dyneema fabrics, or the like), poly(p-phenylene-2,6-benzobisoxazole) (PBO, e.g., Zylon or the like), poly (azanediyl-1,4-phenyleneazanediylterephthaloyl) (para-aramid, e.g., Kevlar or the like), combinations thereof, or the like. In some embodiments, the self-sealing fabric structure 110 may be formed of other fabrics having good resistance to materials to be enclosed in the fuel cell 102, high yield strengths (e.g., yield strengths ranging from about 0.15 GPa to about 0.90 GPa, or from about 0.30 GPa to about 0.075 GPa), and low densities. The self-sealing fabric structure 110 may be formed of a fabric material that is formulated to resist penetration by a projectile that penetrates the fuel cell 102. The material of the self-sealing fabric structure 110 may be leakproof with respect to liquids or gases that are contained within the fuel cell 102 (e.g., watertight, airtight, fuel-tight, etc.).

The self-sealing fabric structure 110 may be formed of a number of layers of fabric that are loosely contained between the inner layer 104 and the outer layer 108. In some embodiments, the self-sealing fabric structure 110 may have a thickness ranging from about 0.100 inches to about 0.400 inches. The self-sealing fabric structure 110 may be formed by stacking layers of a self-sealing fabric. In some embodiments, the self-sealing fabric structure 110 may include from 10 layers of self-sealing fabric to 45 layers of self-sealing fabric. Each layer of the self-sealing fabric may have a thickness ranging from about 0.006 inches to about 0.009 inches. In some embodiments, each layer of self-sealing fabric forming the self-sealing fabric structure 110 may be formed from one or more sub-layers, such as two to three sub-layers, each having a thickness of about 0.003 inches. Forming the self-sealing fabric structure 110 with a thickness greater than the prescribed range may add unnecessary weight to the fuel cell 102 and may undesirably increase the size of the fuel cell 102; while forming the self-sealing fabric structure 110 with a thickness less than the prescribed range may be insufficient to capture projectiles and seal holes formed in the fuel cell 102. Although the self-sealing fabric structure 110 is illustrated in FIG. 2C as filling the space between the inner intermediate layer 112 and the outer intermediate layer 114, at least portions of the self-sealing fabric structure 110 may be separated from the inner intermediate layer 112 and/or the outer intermediate layer 114 by a gap, which may be filled by air or the like. This provides space for excess material of the self-sealing fabric structure 110 and space for the self-sealing fabric structure 110 to move when the fuel cell is penetrated by a projectile.

In some embodiments, the self-sealing fabric structure 110 may have a thickness equal to a thickness of the rubber-based sealing liners. In some embodiments, the self-sealing fabric structure 110 may be formed of a material having a density ranging from about 0.97 g/cm$^3$ to about 1.56 g/cm$^3$. However, because the layers of the self-sealing fabric are loosely stacked in the self-sealing fabric structure 110, the self-sealing fabric structure 110 may have a density as low as about 22% of the density of the material making up the layers of the self-sealing fabric. As such, the self-sealing fabric structure 110 may have a density ranging from about 0.20 g/cm$^3$ to about 0.50 g/cm$^3$ or from about 0.2 g/cm$^3$ to about 0.97 g/cm$^3$. The self-sealing fabric structure 110 may have a density that is about half a density of rubber-based sealing liners. Because the rubber-based sealing liners make up about 40% of the weight of conventional tanks, replacing the rubber-based sealing liners with the self-sealing fabric structure may reduce the weight of the fuel cell 102 by about 20%. In some embodiments, the self-sealing fabric structure 110 may have a thickness less than the thickness of the rubber-based sealing liners, such that the weight of the fuel cell 102 may be further reduced.

The self-sealing fabric structure 110 is formulated to self-seal, or self-heal, a hole therein, such as a hole formed by a projectile or the like. This reduces the leakage of the fuel 106 from the fuel cell 102 when the fuel cell 102 is penetrated. The self-sealing fabric structure 110 does not require water, fuel or aromatics to be activated or triggered to expand to fill the hole formed in the fuel cell 102. As such, the self-sealing fabric structure 110 may be formed of materials that are not reactive with substances to be stored in the fuel cell 102. Further, the self-sealing fabric structure 110 may be formed of materials that are more flexible than conventional rubber used in rubber-based sealing liners. This is particularly beneficial when the fuel cell 102 is a flexible structure, such as a flexible fuel bag.

The self-sealing fabric structure 110 may be formed in the fuel cell 102 by providing a structure including the inner layer 104 and the inner intermediate layer 112. The self-sealing fabric layers of the self-sealing fabric structure 110 are loosely wrapped around the inner intermediate layer 112. Each layer of the self-sealing fabric in the self-sealing fabric structure 110 may include excess fabric ranging from about 100% to about 400% of the area of the inner intermediate layer 112 and/or the inner layer 104 to be contained. In some embodiments, the self-sealing fabric may be sized to include an overlap seam ranging from about 5 mm to about 50 mm for each wall of the fuel cell 102 to be covered. This provides sufficient material of the self-sealing fabric to catch and move with a projectile and to seal a hole formed by the projectile, without adding unnecessary weight to the fuel cell 102. The layers of the self-sealing fabric are loosely adhered to the inner intermediate layer 112 such that underlying layers of the self-sealing fabric do not move while the self-sealing fabric structure 110 is formed. The layers of the self-sealing fabric are adhered to the inner intermediate layers 112 by an adhesive configured to allow the layers of the self-sealing fabric to move when the completed fuel cell 102 is struck by a projectile. The layers of the self-sealing fabric may be wrapped around and adhered to the inner intermediate layers 112 by hand, by mechanical means, or the like. Once the layers of the self-sealing fabric reach a sufficient thickness, the outer intermediate layer 114 and the outer layer 108 are formed over the self-sealing fabric structure 110.

The self-sealing fabric structure 110 may be specifically configured to protect the fuel cell 102 from specific threats, such as specific calibers of bullets and the like, based on the thickness of the self-sealing fabric structure 110, the number of layers of the self-sealing fabric included in the self-sealing fabric structure 110, how tight the self-sealing fabric structure 110 is wrapped around the inner intermediate layers 112, how much extra fabric is included in each layer of the self-sealing fabric, and the like. The structure of the self-sealing fabric structure 110 may further be altered based on whether the fuel cell 102 is designed to be pressurized, and based on what pressure the fuel cell 102 is designed to be operated at. For example, in some embodiments, 17 layers of the self-sealing fabric may be included in the self-sealing fabric structure 110 to protect an un-pressurized fuel cell 102 against a 0.50 caliber projectile, while 30 layers of the self-sealing fabric may be included in the self-sealing fabric structure 110 to protect a pressurized fuel cell 102 against a 0.50 caliber projectile. Providing the self-sealing fabric structure 110 with a greater density increases the amount of energy that may be absorbed by the self-sealing fabric structure 110, and may be useful for higher operating pressures in the fuel cell 102. Providing the self-sealing fabric structure 110 with a lower density provides for greater projectile capturing ability and reduces the weight of the self-sealing fabric structure 110. In an embodiment in which the self-sealing fabric structure 110 is intended to provide defense again projectiles having a diameter of less than about 9 mm, the self-sealing fabric structure 110 may have a yield strength ranging from about 0.20 GPa to about 0.80 GPa, include from 6 to 33 layers of the self-sealing fabric, have a material thickness ranging from about 0.05 inches to about 0.3 inches (e.g., the material of the self-sealing fabric in the self-sealing fabric structure 110 may have a thickness ranging from about 0.05 inches to about 0.3 inches, but may fill a 0.4 inch space between the inner intermediate layers 112 and the outer intermediate layers 114), and may have a density ranging from about 0.2 g/cm$^3$ to about 0.97 g/cm$^3$. In an embodiment in which the self-sealing fabric structure 110 is intended to provide defense again projectiles having a diameter of less than about 12 mm, the self-sealing fabric structure 110 may have a yield strength ranging from about 0.25 GPa to about 0.75 GPa, include from 11 to 56 layers of the self-sealing fabric, have a material thickness ranging from about 0.1 inches to about 0.5 inches, and may have a density ranging from about 0.2 g/cm$^3$ to about 0.97 g/cm$^3$. In an embodiment in which the self-sealing fabric structure 110 is intended to provide defense again projectiles having a diameter of ranging from about 12 mm to about 15 mm, the self-sealing fabric structure 110 may have a yield strength ranging from about 0.20 GPa to about 0.90 GPa, include from 17 to 83 layers of the self-sealing fabric, have a material thickness ranging from about 0.15 inches to about 0.75 inches, and may have a density ranging from about 0.2 g/cm$^3$ to about 0.97 g/cm$^3$. In an embodiment in which the self-sealing fabric structure 110 is intended to provide defense again projectiles having a diameter of greater than about 15 mm, the self-sealing fabric structure 110 may have a yield strength ranging from about 0.30 GPa to about 1.00 GPa, include from 22 to 111 layers of the self-sealing fabric, have a material thickness ranging from about 0.2 inches to about 1 inch, and may have a density ranging from about 0.2 g/cm$^3$ to about 0.97 g/cm$^3$.

Figure 3B:
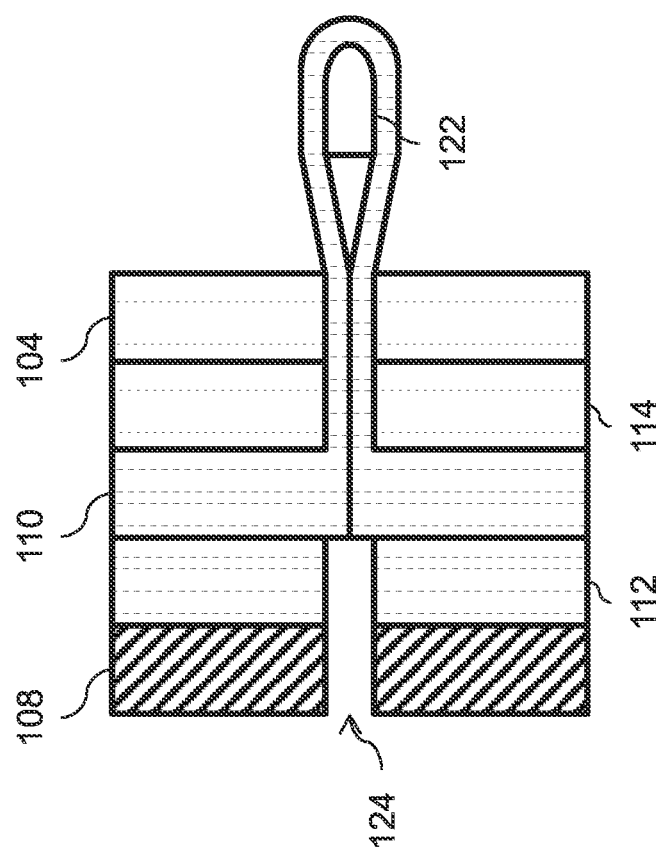

FIGS. 3A and 3B illustrate cross-sectional views of a portion of a wall of the fuel cell 102 before and after the wall is struck by a projectile 122, respectively. As illustrated in FIG. 3B, a hole 124 is formed extending through the outer layer 108 and the outer intermediate layer 114. The projectile 122 is caught in the self-sealing fabric structure 110 and the self-sealing fabric structure 110 and the projectile 122 continue to penetrate through the inner intermediate layer 112 and the inner layer 104. In some embodiments, the material of the self-sealing fabric structure 110 that surrounds the projectile 122 may cause the diameter of the hole 124 to become larger in the inner intermediate layer 112 and the inner layer 104 compared to the outer intermediate layer 114 and the outer layer 108.

The layers of the self-sealing fabric structure 110 may be wrapped loosely around the inner intermediate layer 112 and/or the inner layer 104 such that the self-sealing fabric structure 110 includes excess material. As illustrated in FIG. 3B, the excess material of the self-sealing fabric structure 110 allows for material of the self-sealing fabric structure 110 to be pulled into the interior of the fuel cell 102 and the excess material pulled through the hole 124 seals the hole 124. In some cases, energy from the projectile 122 may continue through the fuel cell 102 and may also damage a wall of the fuel cell 102 opposite the wall struck by the projectile 122 in the direction in which the projectile 122 is traveling. This phenomenon is known as hydrodynamic ram (HRAM). The HRAM may damage the wall of the fuel cell 102 opposite the wall struck by the projectile 122, such as any of the inner layer 104, the inner intermediate layer 112, the outer intermediate layer 114, and/or the outer layer 108. However, the self-sealing fabric structure 110 may simply bulge when impacted by the HRAM, preventing fuel leaks from the wall of the fuel cell 102 opposite the wall struck by the projectile 122 in addition to the wall struck by the projectile 122.

Because the sealing action is physical, rather than chemical as in rubber-based sealing liners, the hole 124 is immediately sealed. The physical sealing action does not require activation by the liquid contained in an enclosure such that the self-sealing fabric structure 110 can be used in any type of liquid enclosure, regardless of the liquid to be contained in the enclosure. The material of the self-sealing fabric structure 110 is not activated by the liquid contained in an enclosure, which prevents the self-sealing fabric structure 110 from degrading or being prematurely activated, even in cases in which the inner intermediate layer 112 and/or the inner layer 104 are compromised. The self-sealing fabric structure 110 has a density of about half the density of rubber-based sealing liners, which reduces the weight of fuel cells 102 to which the self-sealing fabric structure 110 is applied by approximately 20%.

In some embodiments, the self-sealing fabric structure 110 may be repairable after the fuel cell 102 is penetrated by a projectile. For example, the self-sealing fabric structure 110 may be removed from the fuel cell 102, any portion of the self-sealing fabric structure 110 may be removed and patched or otherwise replaced, and the self-sealing fabric structure 110 may be re-installed on the fuel cell 102. Conventional rubber-based sealing liners are activated and become inoperable upon exposure to fuel. In contrast, the self-sealing fabric structure 110 physically seals punctures in the fuel cell 102 and is not negatively impacted by exposure to fuel, which allows for the self-sealing fabric structure 110 to seal multiple punctures in close proximity to one another, and for the self-sealing fabric structure 110 to be repairable.

Figure 4C:
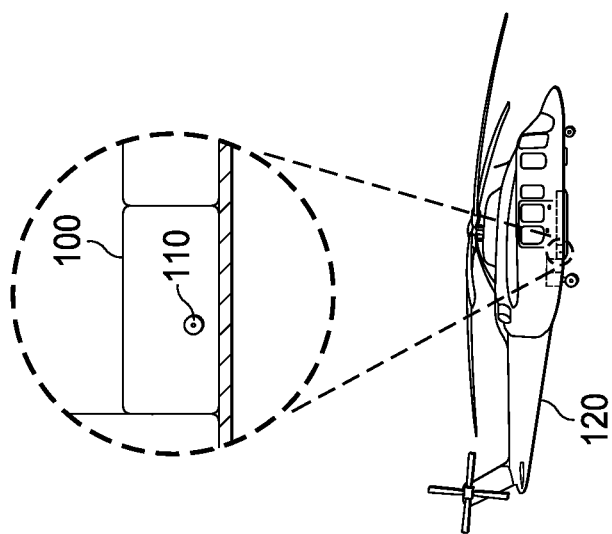
FIGS. 4A through 4C illustrate a rotorcraft including a self-sealing fabric structure being struck by a projectile, in accordance with some embodiments.
Figure 4C:
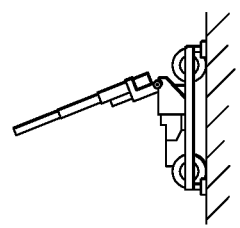
Figure 4B:
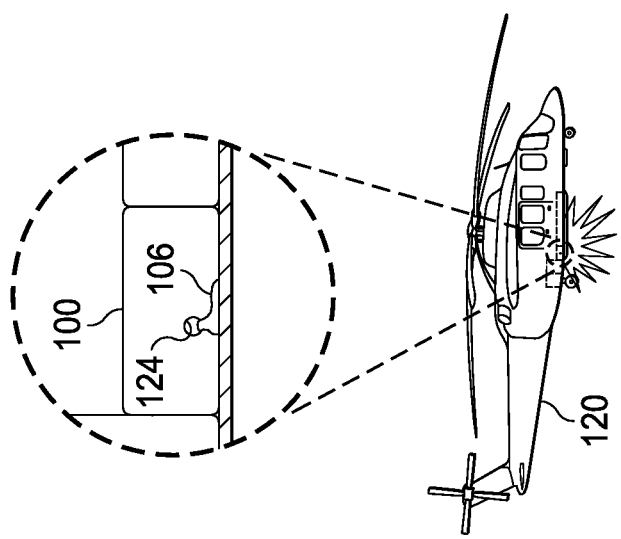
Figure 4B:
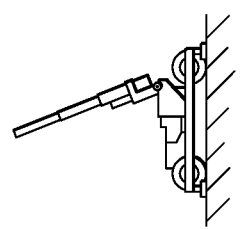
Figure 4A:
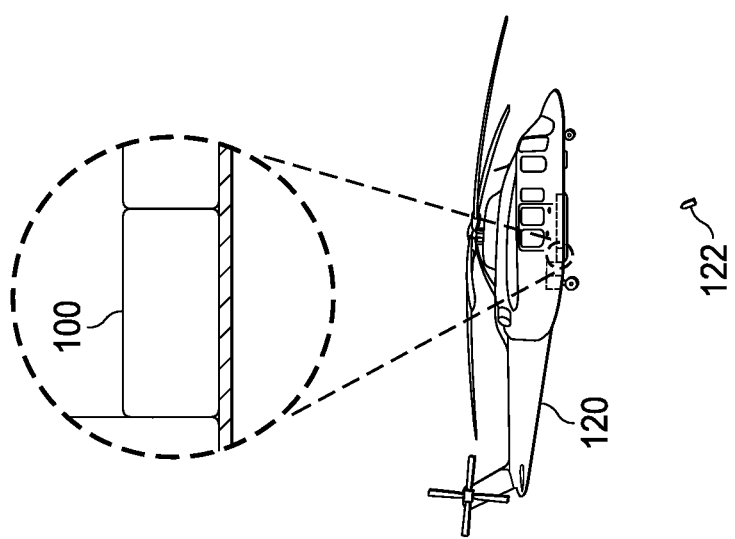
Figure 4A:
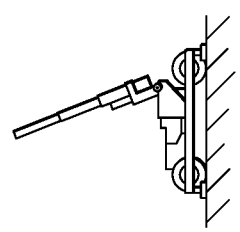

FIGS. 4A through 4C illustrate an operating scenario for a rotorcraft 120, which utilizes the self-sealing fabric structure 110. In FIG. 4A, a projectile 122 has been fired at the rotorcraft 120. Even when the inner layer 104 and the outer layer 108 are formed from materials that are resistant to being pierced, foreign objects such as the projectile 122 may pierce through the outer layer 108 and subsequently through the inner layer 104, leaving a hole 124. The hole 124 allows fuel 106 to leak out of a fuel cell 102 of the fuel tank 100, as illustrated in FIG. 4B. As illustrated in FIG. 4C, the self-sealing fabric structure 110 is configured to quickly seal the hole 124. As described previously, the self-sealing fabric structure 110 is configured to immediately seal the hole 124 physically by being pulled through the hole 124 into the fuel cell 102. The self-sealing fabric structure 110 may be configured to protect against specific threats. For example, the number of layers, tightness of packing, and the like of the self-sealing fabric structure 110 may be selected to guard against specific threats, such as a 0.50 caliber round, a 14.7 mm round, a 20 mm round, or the like.

Figure 5A:
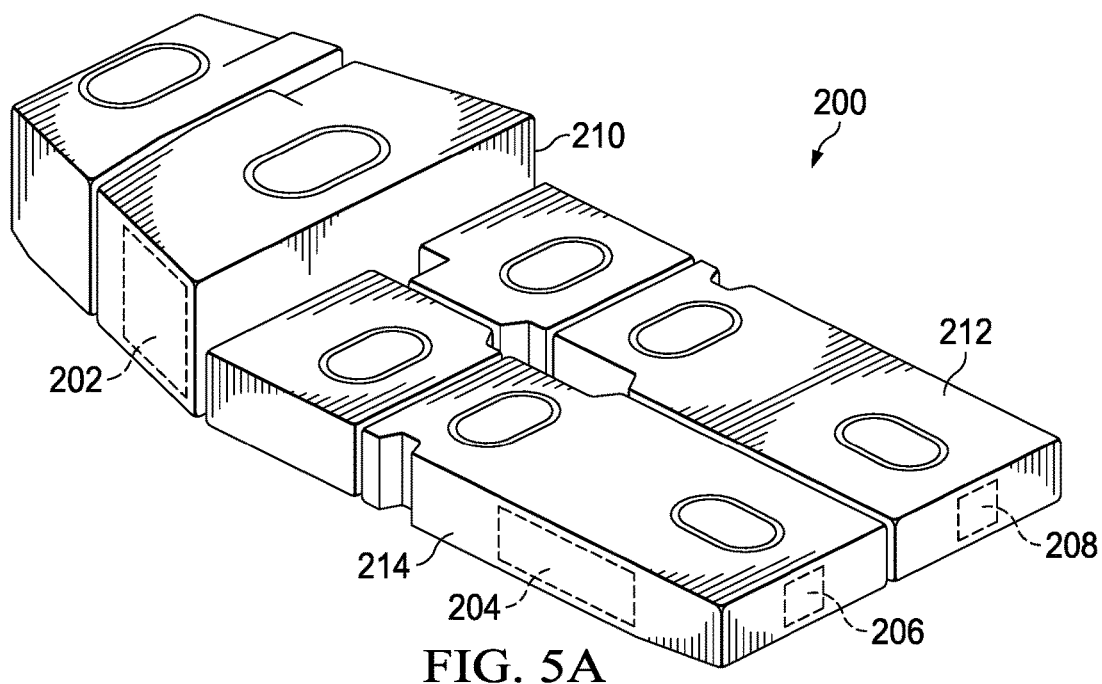
FIGS. 5A through 5C illustrate fuel cells including a self-sealing fabric structure, in accordance with some embodiments.
Figure 5B:
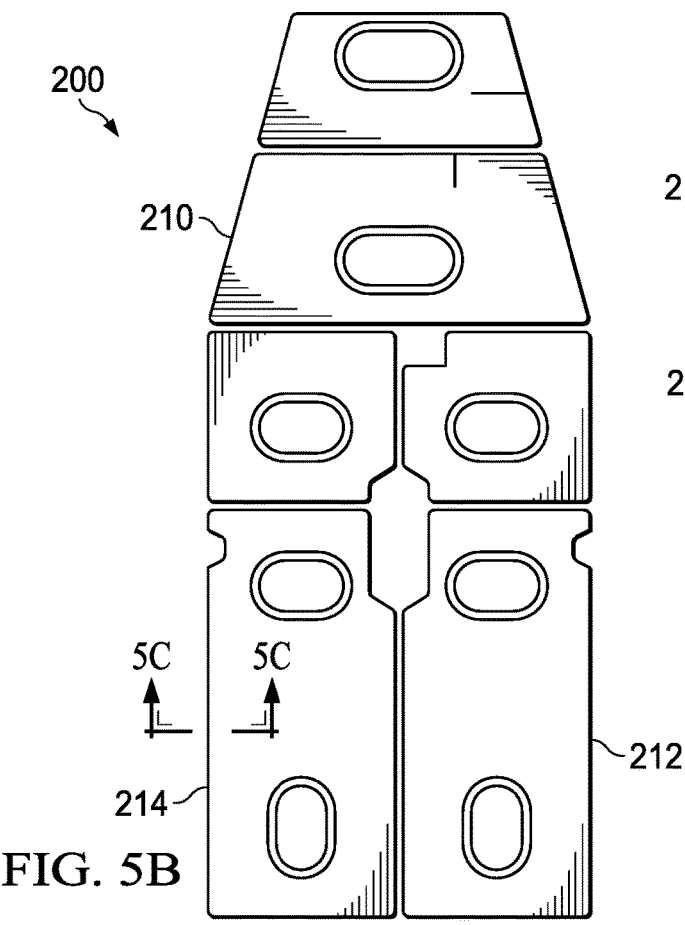
Figure 5C:
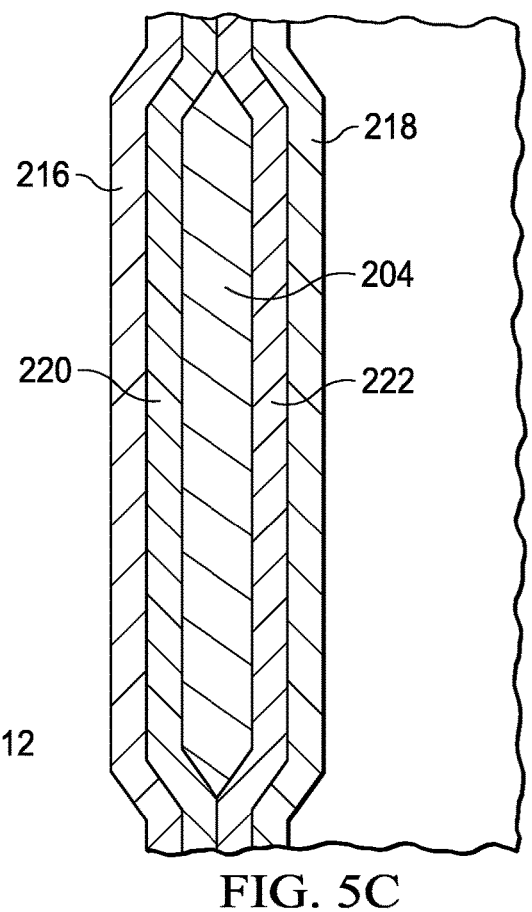

FIGS. 5A through 5C illustrate a fuel tank 200 for a rotorcraft, such as the rotorcraft 10 illustrated in FIGS. 1A through 1B. Self-sealing fabric patches 202, 204, 206, and 208 are selectively included in only a portion of the side walls of fuel cells in the fuel tank 200. More particularly, a self-sealing fabric patch 202 is included on the starboard side of a fuel cell 210, a self-sealing fabric patch 208 is included on the forward side of a fuel cell 212 and a self-sealing fabric patch 204 and a self-sealing fabric patch 206 are included on the starboard and forward sides of a fuel cell 214, respectively. Other self-sealing fabric patches may also be included on the fuel cells of the fuel tank 200, such as self-sealing fabric patches on the port or bottom sides of the fuel cells. Whether all or a portion of the sides of each of the fuel cells of the fuel tank 200 includes the self-sealing fabric patches may depend on military specifications. For example, military specifications may require that fuel cells have a high protection level, in which case all sides of each of the fuel cells may include the self-sealing fabric structure 110, as illustrated for the fuel cell 102 in FIG. 2C. In the embodiment illustrated in FIGS. 5A through 5C, only portions of the selected fuel cell sides include the self-sealing fabric, resulting in a lower level of protection, which may be sufficient for certain low protection military specifications.

FIG. 5C illustrates a self-sealing fabric patch 204 on the starboard side of fuel cell 214, which is representative of the other self-sealing fabric patches included in the fuel cells of the fuel tank 200. The self-sealing fabric patch 204 is positioned in a portion of the volume between an outer layer 216 and an inner layer 218. While the self-sealing fabric patch 204 is not illustrated as extending from the top to the bottom sides of the fuel cell 214, in some embodiments, the self-sealing fabric patch 204 may extend the entire length between the top and bottom sides of the fuel cell 214. In some embodiments, an outer intermediate layer 220 and an inner intermediate layer 222 may be included on either or both sides of the self-sealing fabric patch 204. In some embodiments, the materials and properties of the outer layer 216 of the fuel cells of the fuel tank 200 are regulated and/or subject to rigorous specifications. However, in some embodiments, the self-sealing fabric patches may be coupled to the exterior side of the outer layer 216 on any of fuel cells of the fuel tank 200. Such exterior self-sealing fabric patches may be coupled to the outer layer 216 in any manner such as by using an adhesive. In some embodiments, the self-sealing fabric patches 202, 204, 206, and 208 as well as any exterior self-sealing fabric patches may include an outer film or pouch in which the self-sealing fabric is held.

Figure 6:
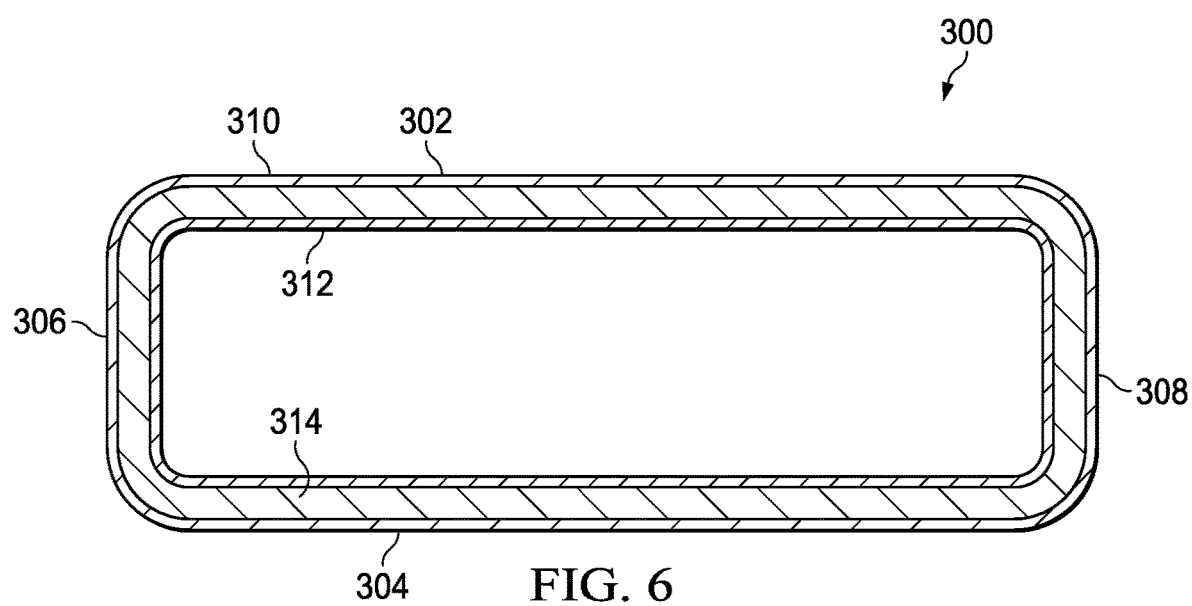
FIG. 6 illustrate a fuel cell including a self-sealing fabric structure, in accordance with some embodiments.

FIG. 6 illustrates a fuel cell 300 utilizing a self-sealing fabric structure 314. The fuel cell 300 may be a fuel cell for an aircraft, a ground vehicle, or any other machine or device requiring fuel. The fuel cell 300 has a top wall 302, a bottom wall 304 and peripheral walls 306 and 308. All of the walls of the fuel cell 300 include an outer layer 310 and an inner layer 312. The self-sealing fabric structure 314 is interposed between the outer layer 310 and the inner layer 312 on all of the walls 302, 304, 306, and 308 of the fuel cell 300. The fuel cell 300 does not include any intermediate layers, such that the self-sealing fabric structure 314 fills the entire volume defined between the outer layer 310 and the inner layer 312. In some embodiments, the self-sealing fabric structure 314 may be included in only a portion of the walls 302, 304, 306, and 308 of the fuel cell 300, and a different substance or no substance at all may be between the outer layer 310 and the inner layer 312 where the self-sealing fabric structure 314 is absent.

Figure 7A:
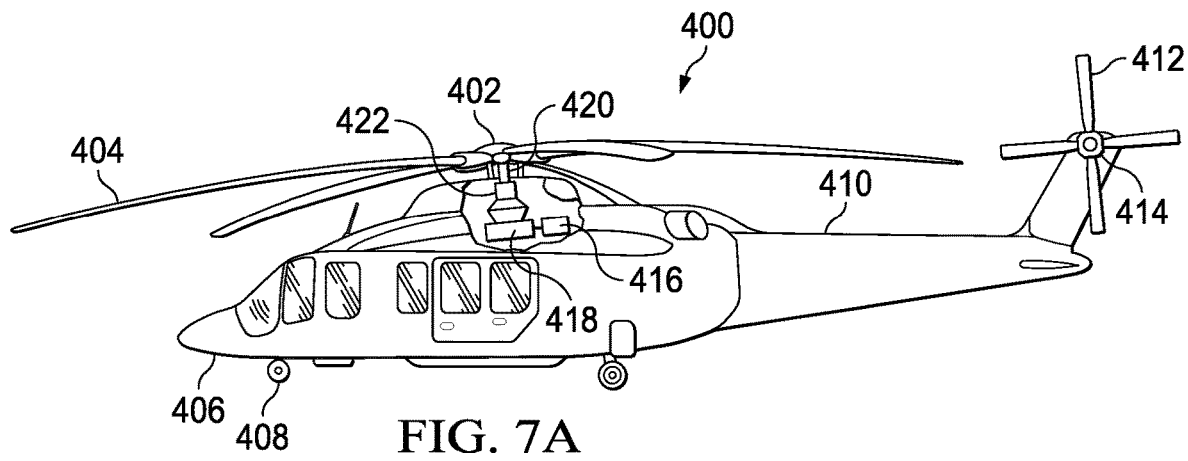
FIGS. 7A through 7C illustrate a rotorcraft including a self-sealing fabric structure, in accordance with some embodiments.
Figure 7B:
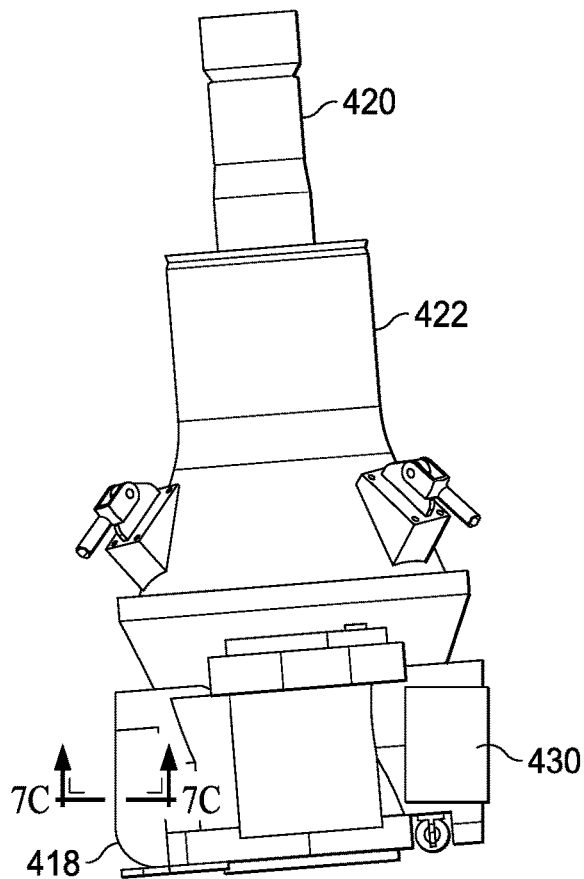
Figure 7C:
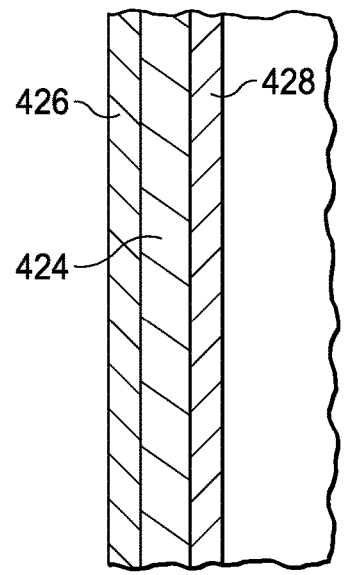

FIGS. 7A through 7C illustrate a rotorcraft 400, which utilizes the self-sealing fabric structures. The rotorcraft 400 is depicted as a helicopter. The rotorcraft includes a main rotor system 402, which includes a plurality of main rotor blades 404. The main rotor system 402 is rotatable relative to a fuselage 406 of the rotorcraft 400. The pitch of the main rotor blades 404 can be collectively and/or cyclically manipulated to selectively control direction, thrust and lift of the rotorcraft 400. A landing gear system 408 provides ground support for the rotorcraft 400. A tail section 410 extends from the fuselage 406. A tail rotor 414 includes a plurality of tail rotor blades 412 and is rotatably coupled to the aft portion of the tail section 410. The main rotor system 402 is powered by an engine 416 via a main rotor gearbox 418. A mast 420 extends through a top case 422.

The main rotor gearbox 418 contains gears and lubricant. In the event that a hole is formed in the main rotor gearbox 418, lubricant may leak from the main rotor gearbox 418, subjecting the gears therein to damage. FIG. 7C illustrates a cross-sectional view of a wall of the main rotor gearbox 418, including a self-sealing fabric structure 424. The self-sealing fabric structure 424 is surrounded by an outer wall 426 and an inner wall 428. In some embodiments, the main rotor gearbox 418 may include only a single wall. In some embodiments, the main rotor gearbox 418 may be protected from projectiles by one or more self-sealing fabric patches 430, in addition to or in place of the self-sealing fabric structure 424 on the inside of the outer wall 426. The self-sealing fabric patches 430 may be adhered on any portion of the main rotor gearbox 418 that is susceptible to damage by incoming projectiles. In some embodiments, the self-sealing fabric may cover or be included on all walls of the main rotor gearbox 418. The inclusion of the self-sealing fabric structure 424 and the self-sealing fabric patches 430 on the main rotor gearbox 418 is a non-limiting example of the wide variety of applications for which the self-sealing fabric of the disclosed embodiments may be used.

Figure 8A:
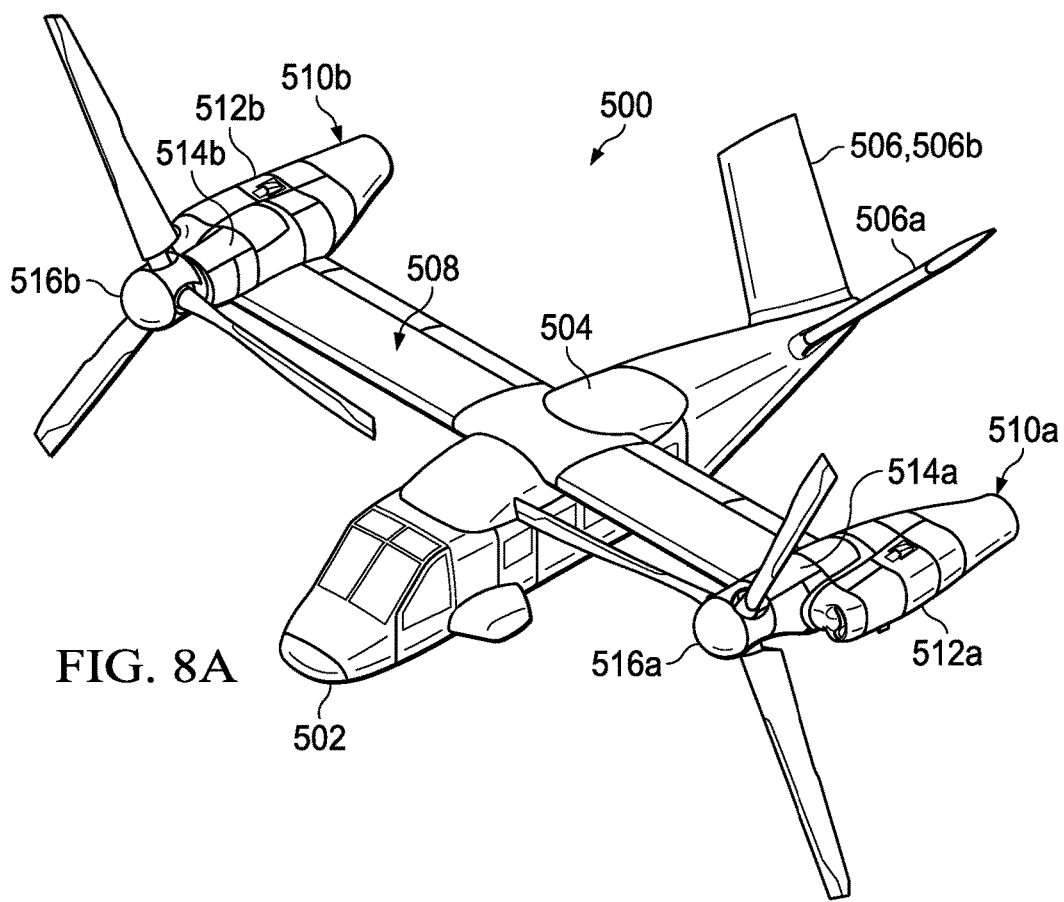
FIGS. 8A through 8F illustrate a tiltrotor aircraft including a self-sealing fabric structure, in accordance with some embodiments.
Figure 8B:
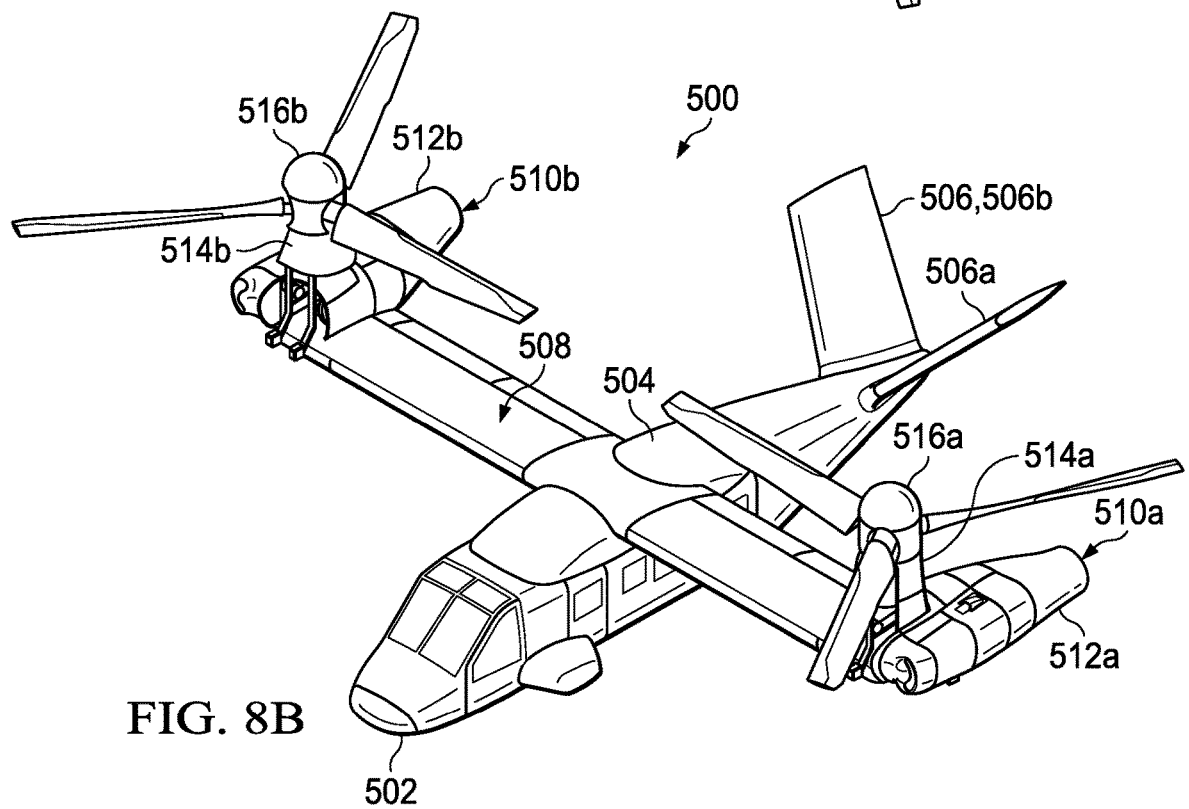
Figure 8C:
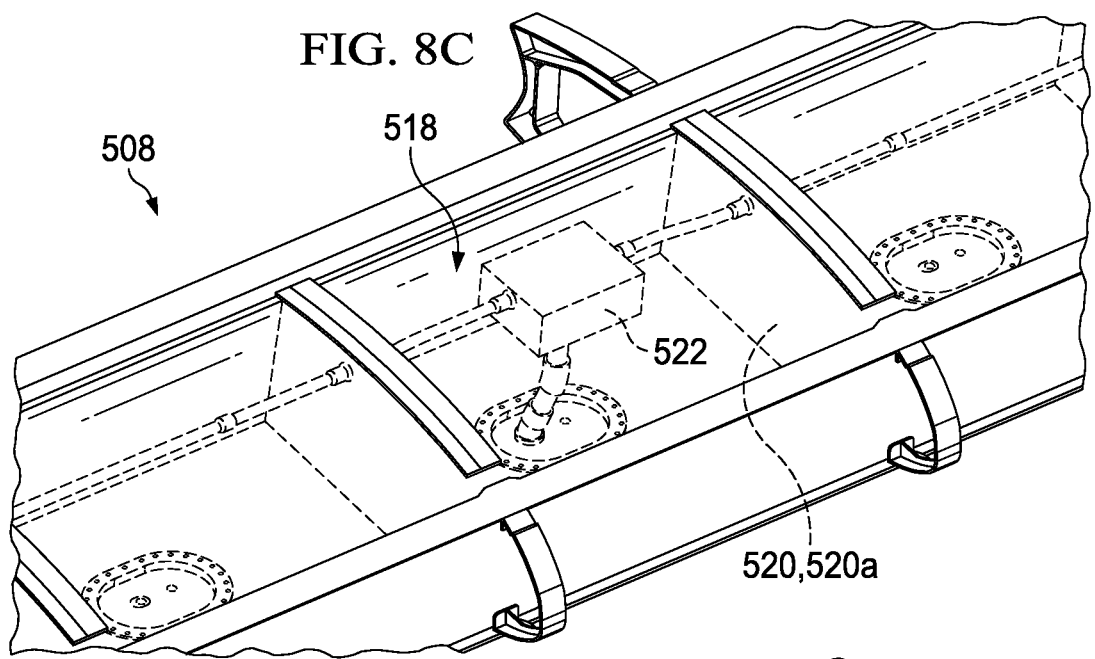
Figure 8D:
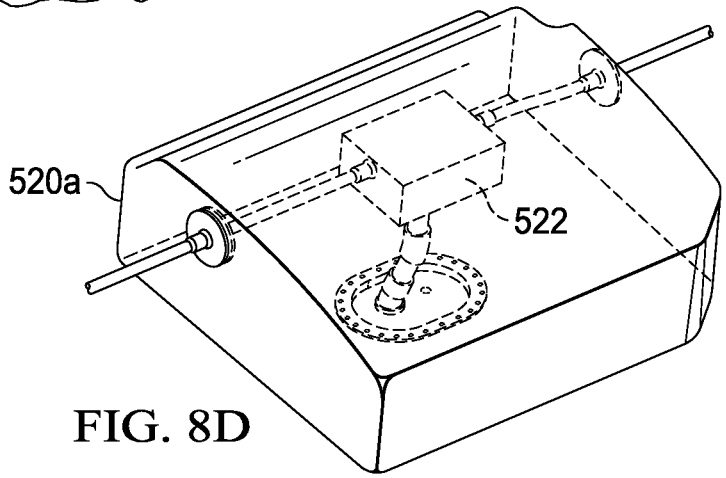
Figure 8E:
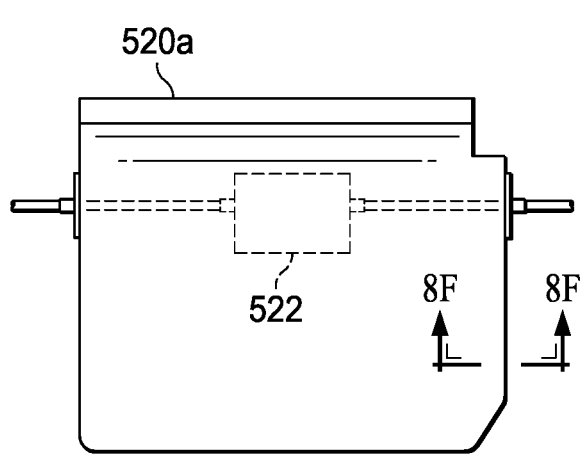

FIGS. 8A through 8F illustrate a tiltrotor aircraft 500, which utilizes the self-sealing fabric structures. The tiltrotor aircraft 500 includes a fuselage 502, a wing mount assembly 504, and a tail assembly 506 including rotatably mounted tail members 506a and 506b. The tail members 506a and 506b include control surfaces operable for horizontal and/or vertical stabilization during forward flight. A wing assembly 508 is supported by the wing mount assembly 504. Propulsion assemblies 510a and 510b are coupled to outboard ends of the wing assembly 508. The propulsion assembly 510a includes a nacelle depicted as fixed pylon 512a that houses an engine and a transmission. The nacelle may be fixed relative to the wing assembly 508. The propulsion assembly 510a further includes a mast assembly 514a having a mast that is rotatable relative to the fixed pylon 512a, the wing assembly 508, and the fuselage 502 between a generally horizontal orientation, as illustrated in FIG. 8A, and a generally vertical orientation, as illustrated in FIG. 8B. The propulsion assembly 510a also includes a proprotor assembly 516a, including proprotor blade assemblies radiating therefrom, which is rotatable responsive to torque and rotational energy provided via a rotor hub assembly and a drive system mechanically coupled to the engine and the transmission housed by the fixed pylon 512a. Similarly, the propulsion assembly 510b includes a nacelle depicted as fixed pylon 512b that houses an engine and a transmission and a mast assembly 514b that is rotatable relative to the fixed pylon 512b, the wing assembly 508, and the fuselage 502. The propulsion assembly 510b also includes a proprotor assembly 516b, including proprotor blade assemblies radiating therefrom, which is rotatable responsive to torque and rotational energy provided via a rotor hub assembly and a drive system mechanically coupled to the engine and the transmission housed by the fixed pylon 512b.

FIG. 8A illustrates the tiltrotor aircraft 500 in an airplane or forward flight mode, in which the mast assemblies 514a and 514b are oriented in a generally horizontal orientation and the proprotor assemblies 516a and 516b are rotating in a substantially vertical plane to provide a forward thrust enabling wing assembly 508 to provide a lifting force responsive to forward airspeed, such that the tiltrotor aircraft 500 flies much like a conventional propeller-driven aircraft. FIG. 8B illustrates the tiltrotor aircraft 500 in a helicopter or vertical takeoff and landing (VTOL) flight mode, in which the mast assemblies 514a and 514b are oriented in a generally horizontal orientation and the proprotor assemblies 516a and 516b are rotating in a substantially horizontal plane to provide a lifting thrust, such that the tiltrotor aircraft 500 flies much like a conventional helicopter. It should be appreciated that the tiltrotor aircraft 500 can be operated such that the proprotor assemblies 516a and 516b are selectively positioned between the forward flight mode and the VTOL flight mode, which can be referred to as a conversion flight mode. Even though the tiltrotor aircraft 500 has been described as having one engine in each of the fixed pylons 512a and 512b, other engine arrangements are possible and are considered to be within the scope of the present disclosure including, for example, having a single engine which may be housed within the fuselage 502 that provides torque and rotational energy to both of the proprotor assemblies 516a and 516b.

The tiltrotor aircraft 500 includes a fuel system 518, which includes one or more fuel cells 520 disposed inside the wing assembly 508. The fuel cells 520 may be bags or bladders that are flexible, semi-rigid, or rigid. For example, the fuel cells 520 may be fuel bags formed from a para-aramid material (e.g., Kevlar), rubber, or the like. In some embodiments, the fuel cells 520 may be tanks, which may be formed from rigid materials, such as metals, polymers, plastics, or the like. The fuel system 518 may include one or more fuel pumps 522, which may be used to transfer fuel from the fuel cells 520.

Figure 8F:
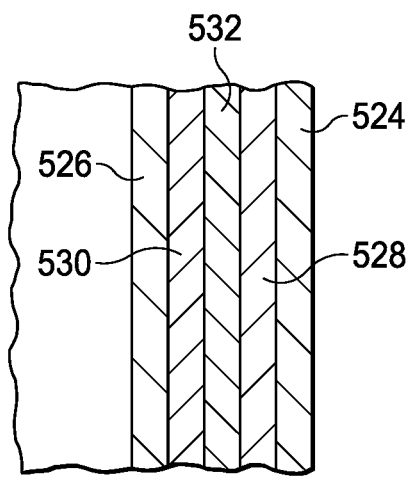

FIG. 8F illustrates a cross-sectional view of a wall of a fuel cell 520a, which is one of the fuel cells 520. The wall of the fuel cell 520a includes an outer layer 524, an inner layer 526, an outer intermediate layer 528, an inner intermediate layer 530, and a self-sealing fabric structure 532 interposed between the outer intermediate layer 528 and the inner intermediate layer 530. In some embodiments, the outer intermediate layer 528 and/or the inner intermediate layer 530 may be omitted from the wall of the fuel cell 520a. The inclusion of the self-sealing fabric structure 532 on the fuel system 518 of the tiltrotor aircraft 500 is illustrative of the wide variety of fuel systems with which the self-sealing fabric of the disclosed embodiments may be used. This includes fuel systems located anywhere on an aircraft, such as the fuselage 502, the wing assembly 508, or elsewhere. The self-sealing fabric of the illustrative embodiments may also be used on external fuel systems.

Figure 9A:
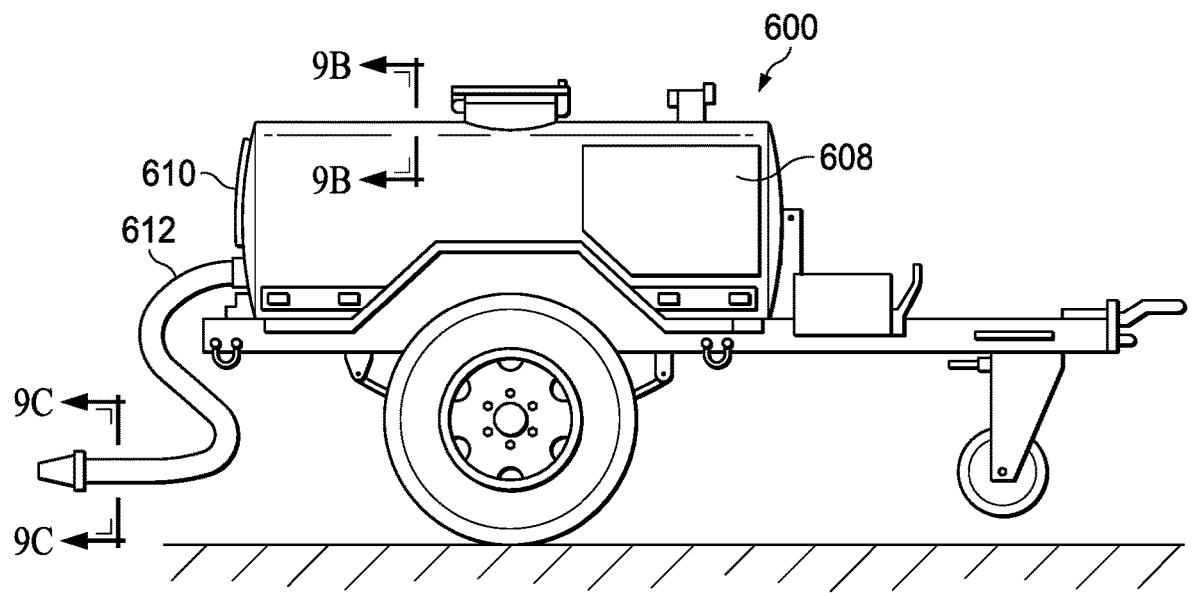
FIGS. 9A through 9C illustrate a water tank and water hose including a self-sealing fabric structure, in accordance with some embodiments.
Figure 9B:
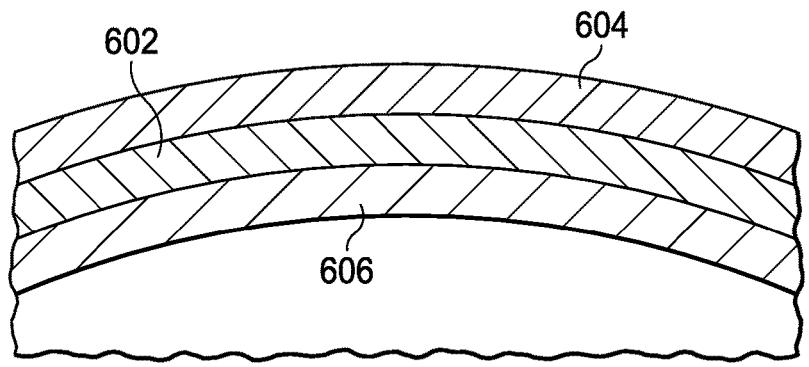
Figure 9C:
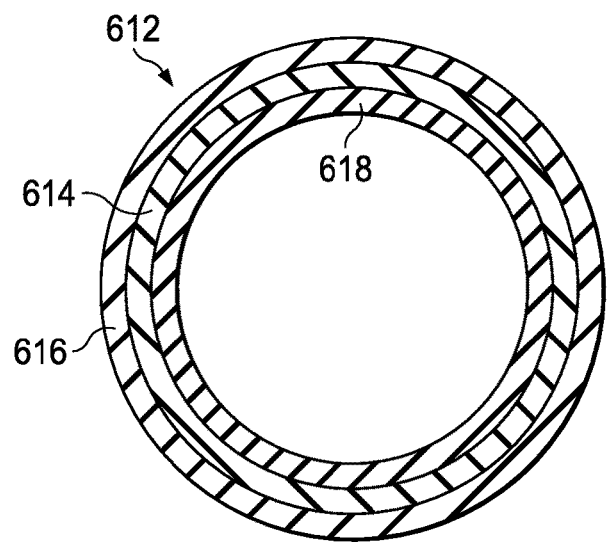

FIGS. 9A through 9C illustrate a transportable water tank 600, which utilizes the self-sealing fabric structures. Water may be a valuable resource in certain operational scenarios, such as forward-operating bases. Projectiles may impact the water tank 600, causing water to leak from the water tank 600 and wasting a valuable resource. Because the self-sealing fabric structures of the disclosed embodiments do not rely on contact with fuel or other aromatics to be activated or triggered, the self-sealing fabric structures may be used in non-fuel applications, such as the water tank 600.

As illustrated in FIG. 9B, a wall of the water tank 600 includes a self-sealing fabric structure 602 between an outer layer 604 and an inner layer 606. In some embodiments, the outer layer 604 may be omitted and the self-sealing fabric structure 602 may be adhered to the outside of the inner layer 606. The illustrated water tank 600 also includes self-sealing fabric patches 608 and 610 coupled to a side and rear of the water tank 600, respectively. The self-sealing fabric of the disclosed embodiments may also be used in hose or transport applications.

FIG. 9C illustrates a cross-sectional view of a hose 612 used to extract water from the water tank 600. The hose 612 includes a self-sealing fabric structure 614 interposed between an outer layer 616 and an inner liner 618. The self-sealing fabric structure 614 prevents water from leaking from the hose 612 in the event that the hose 612 is pierced by an object or projectile. Thus, the self-sealing fabric of the disclosed embodiments may be used in both storage and transport applications for any liquid. While the water tank 600 is illustrated as being movable, the self-sealing fabric may also be used in walls of enclosures that are fixed objects on the ground, such as a water tower or the like. In some embodiments, the self-sealing fabric may be used in a wall of a flat panel that is not part of an enclosure.

In accordance with an embodiment, an aircraft fuel cell includes an inner layer configured to contact a fuel; an outer layer; and a self-sealing fabric structure between the inner layer and the outer layer, the self-sealing fabric structure being configured to capture a projectile and self-seal a hole formed in the inner layer and the outer layer by the projectile. In an embodiment, the self-sealing fabric structure includes an ultra-high molecular weight polyethylene (UHMWPE) fabric. In an embodiment, the self-sealing fabric structure has a thickness of less than 0.400 inches. In an embodiment, the self-sealing fabric structure has a density ranging from 0.2 g/cm$^3$ to 0.97 g/cm$^3$. In an embodiment, the self-sealing fabric structure includes from 10 to 45 layers of self-sealing fabric. In an embodiment, the self-sealing fabric structure includes a fuel-tight material. In an embodiment, the self-sealing fabric structure includes a material having a yield strength ranging from 0.15 GPa to 0.90 GPa. In an embodiment, the self-sealing fabric structure is separated from at least one of the inner layer or the outer layer by a gap. In an embodiment, the self-sealing fabric structure includes excess material configured to be pulled into the hole by the projectile and self-seal the hole. In an embodiment, the self-sealing fabric structure includes a material that is unreactive to the fuel.

In accordance with another embodiment, a method for sealing a liquid storage container includes providing a liquid storage container, the liquid storage container including a self-sealing fabric structure on an inner layer; and in response to a hole being formed in the inner layer of the liquid storage container by a projectile, sealing the hole by catching the projectile in the self-sealing fabric structure, the self-sealing fabric structure being pulled into the liquid storage container by the projectile, and a material of the self-sealing fabric structure sealing the hole. In an embodiment, the method further includes repairing the liquid storage container by replacing a portion of the self-sealing fabric structure. In an embodiment, a material of the self-sealing fabric structure is un-reactive to a liquid stored in the liquid storage container. In an embodiment, the self-sealing fabric structure catches the projectile without the projectile penetrating through the self-sealing fabric structure.

In accordance with yet another embodiment, an aircraft includes a fuselage; a propulsion system powered by a fuel; and a fuel cell configured to store the fuel, the fuel cell including an inner layer configured to contact the fuel; an outer layer; and a self-sealing fabric structure formed from ultra-high molecular weight polyethylene (UHMWPE), the self-sealing fabric structure being interposed between the inner layer and the outer layer, the self-sealing fabric structure being configured to self-seal a hole formed in the inner layer and the outer layer by a projectile. In an embodiment, the self-sealing fabric structure includes excess material configured to be pulled into the hole by the projectile, the excess material being configured to self-seal the hole. In an embodiment, the self-sealing fabric structure is separated from the inner layer or the outer layer by a gap. In an embodiment, the self-sealing fabric structure includes from 10 to 45 layers of UHMWPE fabric. In an embodiment, the inner layer and the outer layer of the fuel cell include flexible layers such that the fuel cell is a flexible fuel bag. In an embodiment, the self-sealing fabric structure is non-reactive with the fuel.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft fuel cell comprising:
an inner layer configured to contact a fuel;
an outer layer; and
a self-sealing fabric structure between the inner layer and the outer layer and separated from an immediately adjacent layer by a gap, wherein the self-sealing fabric structure comprises at least 10 layers of a self-sealing fabric that is unreactive to fuel and is configured to self-seal a hole, in the inner layer formed by a projectile, without being triggered or activated by a liquid to expand to fill the hole, wherein self-sealing the hole formed in the inner layer comprises one or more layers of the self-sealing fabric structure being pulled through the hole in the inner layer by the projectile and plugging the hole.

2. The aircraft fuel cell of claim 1, wherein the self-sealing fabric structure comprises an ultra-high molecular weight polyethylene (UHMWPE) fabric.

3. The aircraft fuel cell of claim 1, wherein the self-sealing fabric structure has a thickness of less than 0.400 inches.

4. The aircraft fuel cell of claim 1, wherein the self-sealing fabric structure has a density ranging from 0.2 g/cm$^3$ to 0.97 g/cm$^3$.

5. The aircraft fuel cell of claim 1, wherein the self-sealing fabric structure includes from 10 to 45 layers of self-sealing fabric.

6. The aircraft fuel cell of claim 1, wherein the self-sealing fabric structure comprises a fuel-tight material.

7. The aircraft fuel cell of claim 1, wherein the self-sealing fabric structure comprises a material having a yield strength ranging from 0.15 GPa to 0.90 GPa.

8. The aircraft fuel cell of claim 1, wherein the self-sealing fabric structure comprises excess material configured to be pulled into the hole by the projectile and self-seal the hole.

9. The aircraft fuel cell of claim 8, wherein the excess material has an area, before self-sealing the hole, that is between about 100% and 400% of the area of the inner layer.

10. The aircraft fuel cell of claim 8, wherein the excess material comprises an overlap seam that is between about 5 mm and about 50 mm for each wall of the fuel that is covered by the self-sealing fabric structure.

11. An aircraft comprising:
a fuselage;
a propulsion system powered by a fuel; and
a fuel cell configured to store the fuel, the fuel cell comprising:
an inner layer configured to contact the fuel;

an outer layer; and a self-sealing fabric structure comprising at least 10 layers of a self-sealing fabric formed from ultra-high molecular weight polyethylene (UHMWPE) that is unreactive to fuel, wherein the self-sealing fabric structure is interposed between the inner layer and the outer layer and separated from an immediately adjacent layer by a gap, wherein the self-sealing fabric structure is configured to self-seal a hole formed in the inner layer by a projectile without being triggered or activated by a liquid to expand to fill the hole, wherein self-sealing the hole formed in the inner layer comprises one or more layers of the self-sealing fabric structure being pulled through the hole in the inner layer by the projectile and plugging the hole.

12. The aircraft of claim 11, wherein the self-sealing fabric structure comprises excess material configured to be pulled into the hole by the projectile, wherein the excess material is configured to self-seal the hole.

13. The aircraft of claim 12, wherein the excess material has an area, before self-sealing the hole, that is between about 100% and 400% of the area of the inner layer.

14. The aircraft of claim 12, wherein the excess material comprises an overlap seam that is between about 5 mm and about 50 mm for each wall of the fuel that is covered by the self-sealing fabric structure.

15. The aircraft of claim 11, wherein the inner layer and the outer layer of the fuel cell comprise flexible layers such that the fuel cell is a flexible fuel bag.

16. A structure, comprising:
an inner layer configured to contact, and contain, a liquid;
an outer layer; and
a self-sealing fabric structure between the inner layer and the outer layer and separated from an immediately adjacent layer by a gap, and wherein the self-sealing fabric structure is adhered to an intermediate layer by an adhesive between the self-sealing fabric structure and the inner layer, wherein the self-sealing fabric structure comprises at least 10 layers of a self-sealing fabric that is unreactive to fuel, wherein the at least 10 layers of the self-sealing fabric are configured to self-seal a hole, formed in the inner layer by a projectile, without being triggered or activated by a liquid to expand to fill the hole, wherein the adhesive is configured to allow layers of the self-sealing fabric structure to move when the self-sealing fabric structure is struck by the projectile, wherein the self-sealing fabric structure comprises excess fabric that has an area between about 100% and 400% of the area of the inner layer, wherein self-sealing the hole formed in the inner layer comprises at least a portion of the excess fabric of the self-sealing fabric structure being pulled through the hole in the inner layer by the projectile and plugging the hole.

17. The structure of claim 16, wherein the self-sealing fabric structure has a thickness of less than 0.400 inches.

18. The structure of claim 16, wherein the self-sealing fabric structure has a density ranging from 0.2 $g/cm^3$ to 0.97 $g/cm^3$.

19. The structure of claim 16, wherein the self-sealing fabric structure includes from 10 to 45 layers of self-sealing fabric.

20. The structure of claim 16, wherein the self-sealing fabric structure comprises a material having a yield strength ranging from 0.15 GPa to 0.90 GPa.

* * * * *